March 30, 1965  J. A. BRINKMAN ETAL  3,175,885
METHOD FOR ARTIFICIAL SYNTHESIS OF DIAMONDS
Original Filed July 1, 1960  5 Sheets-Sheet 1

FIG. I

INVENTORS
JOHN A. BRINKMAN
CHARLES J. MEECHAN
HERMAN M. DIECKAMP
BY

ATTORNEY

INVENTORS
JOHN A. BRINKMAN
CHARLES J. MEECHAN
HERMAN M. DIECKAMP
BY
*Gerald G. Lois*
ATTORNEY March 30, 1965   J. A. BRINKMAN ETAL   3,175,885
METHOD FOR ARTIFICIAL SYNTHESIS OF DIAMONDS
Original Filed July 1, 1960   5 Sheets-Sheet 3

*INVENTORS*
JOHN A. BRINKMAN
CHARLES J. MEECHAN
BY HERMAN M. DIECKAMP

*Gerald U. Foris*
ATTORNEY

INVENTOR.
JOHN A. BRINKMAN
CHARLES J. MEECHAN
HERMAN M. DIECKAMP

ATTORNEY

United States Patent Office 3,175,885
Patented Mar. 30, 1965

3,175,885
METHOD FOR ARTIFICIAL SYNTHESIS OF DIAMONDS
John A. Brinkman, Canoga Park, Charles J. Meechan, Reseda, and Herman M. Dieckamp, Canoga Park, Calif., assignors to North American Aviation, Inc.
Original application July 1, 1960, Ser. No. 41,224, now Patent No. 3,142,539, dated July 28, 1964. Divided and this application Feb. 12, 1964, Ser. No. 352,409
6 Claims. (Cl. 23—209.1)

This is a division of application Serial No. 41,224, filed July 1, 1960, now U.S. Patent 3,142,539, issued July 28, 1964, which is a continution-in-part of application Serial No. 634,773, filed January 17, 1957, now abandoned.

Our invention relates to a method for artificially producing diamonds, and more particularly to a method for producing large diamond crystals from a seed diamond.

In nature, diamonds presumably were formed at high temperatures under extremely high pressures. Laboratory attempts to attain the necessary high temperatures and pressures have utilized two general schemes. The first involves rapid quenching of a saturated solution of carbon in molten iron or other molten media, resulting in solidification at the outer surface first, the metal subsequently developing its own internal pressure. Due to the rapid cooling rates involved in such schemes, only microscopic diamonds have been produced, since not enough time is allowed for sufficient diffusion of carbon atoms to produce reasonably large diamonds. The other scheme involves the use of extremely high temperatures and pressures, of the order of 50,000 atmospheres, above about 2200° K. Diamonds produced in this manner are quite small, and the production costs are not lower than the cost of natural diamonds, due to the complex equipment required. Therefore, a method of diamond production which does not require extremely high pressures and temperatures would be experimentally and economically desirable. In addition, if a continuous process of sufficient time duration could be developed, the size limitations heretofore associated with artificial diamond production could be eliminated.

Accordingly, an object of our invention is to provide an improved method for the artificial production of diamonds.

Another object is to provide such a method, which does not require use of extremely high temperatures and pressures.

Another object is to provide a method and apparatus for the production of relatively large single diamond crystals from a small seed diamond in either a batch or continuous process.

Still another object is to provide such a process for operation at about atmospheric pressure.

Other objects and advantages of our invention will become apparent from the following detailed description, taken together with the appended claims and the attached drawings.

In accordance with our present invention, we have provided a method for the artificial production of diamonds which has a number of distinct advantages over any previous method for the artificial production of diamonds. Extremely high temperatures and pressures are not necessary, and there is no known theoretical or practical limit to the size of the diamonds which may be obtained. Our process may be very suitably conducted at the ambient atmospheric pressure, although there is no restriction to the use of higher pressures. Our method comprises broadly contacting a seed diamond being maintained at a temperature of about 1273–2073° K. with a flux of carbon atoms exceeding a critical minimum value. The critical condition for the carbon atom flux will be defined rigorously below. In general, the requirements which must be met for diamond growth to occur by our method are:

(1) A seed diamond is heated to a temperature in the range of about 1273–2073° K.;

(2) While the seed diamond is maintained in this temperature range, a flux of carbon atoms contacts the diamond surface;

(3) The flux of carbon atoms is sufficiently small at the diamond surface so that no appreciable graphite nucleation occurs, since in our method we are growing the metastable structure of carbon, namely, diamond;

(4) The flux of carbon atoms exceeds a critical minimum value equal to the rate at which carbon atoms are being removed from the diamond surface.

These general requirements will be considered below for a particular source of the carbon atom flux and for the particular method used for transporting the carbon atom flux from the carbon source to the surface of the seed diamond. There are two embodiments of our general method for artificial production of diamonds. In the first embodiment the source of the carbon atom flux is carbonaceous material dissolved in a molten medium, thus providing a solution of carbon atoms in the molten medium, and in the second embodiment carbonaceous material is heated to a sufficiently high temperature to provide a vapor flux of carbon atoms. In the first embodiment, the carbon atoms are transported from the source to the surface of the diamond seed by the molten medium. In the second embodiment, the carbon atoms are transported from the source to the surface of the seed diamond via a vapor stream in a vacuum or an inert gas atmosphere.

MOLTEN MEDIUM PROCESS

This embodiment comprises providing a solution of carbon in a molten medium, having a low carbon solubility, in a reaction apparatus upon which a temperature differential is imposed. This temperature differential arises as a result of one portion of the reaction apparatus being continuously maintained at a temperature $T_1$, while another region of the apparatus is continuously maintained at a higher temperature, $T_2$, in a continuous process. This temperature differential defined as $\Delta T = T_2 - T_1$, may also arise as a result of cycling the temperature of the entire reaction apparatus between $T_2$ and $T_1$ in a batch-type process.

In the continuous process, a seed diamond is positioned in a cooler region of the apparatus, and the molten medium is circulated in the apparatus, its temperature changing from $T_2$ to $T_1$ and back to $T_2$ again as it passes from the hotter to the cooler and back to the hotter region. The molten medium is saturated at $T_2$ with carbon with respect to precipitation of graphite in the hotter region of the apparatus and supersaturated with carbon with respect to precipitation of diamond in the cooler region at $T_1$, thereby producing growth of the seed diamond as a result of precipitation of carbon as diamond on the surface of the seed diamond.

In the batch-type process, the molten medium is saturated with carbon with respect to graphite precipitation while the reaction apparatus is maintained at $T_2$. The apparatus is then cooled to $T_1$ and a seed diamond is inserted into the molten medium, which, at $T_1$, is supersaturated with carbon with respect to diamond precipitation, thereby producing growth of the seed diamond as a result of the precipitation of carbon as diamond on the surface of the seed diamond. After a growth period, the diamond is removed from the molten medium, the apparatus is heated to $T_2$, and the cycle is repeated. The cycle may be repeated a plurality of times, depending on the desired size of the diamond crystal.

The essential condition for both the continuous and the batch-type processes is thus the contacting of a seed diamond with a molten medium in which the solubility limit of carbon is low, the molten medium being supersaturated with carbon with respect to diamond precipitation.

Precipitation of a solid from a liquid solution ordinarily occurs in a crystalline form of the solid. Graphite and diamond are the only solid crystalline forms of carbon. Therefore, we need consider only these two structures as possible forms of solid carbon which can be precipitated. Since the molar free energy of diamond exceeds that of graphite, the solubility limit of carbon in any molten medium, when diamond is used as the source material, exceeds that corresponding to the use of graphite as the source material. Therefore, if a solution is saturated with carbon with respect to precipitation of graphite, it is not yet saturated with respect to precipitation of diamond. For the solution to be also saturated with respect to precipitation of diamond, it must be supersaturated with respect to precipitation of graphite. The amount of such supersaturation depends on the molar free energy difference, $\Delta G$, between the diamond and graphite structures, which in turn depends on the temperature of the solution. The required amount of supersaturation also depends on the solubility limit of carbon in the molten medium, which may vary from one medium to another.

In this embodiment of our invention, the molten medium is saturated with carbon, with respect to graphite precipitation, at $T_2$, and as the molten medium is cooled to $T_1$, at which temperature the seed diamond is maintained, the molten medium becomes highly supersaturated with carbon with respect to the precipitation of graphite, and also, if the temperature differential, $\Delta T$, exceeds a certain critical value, $\Delta T_c$, the molten medium is supersaturated with respect to the precipitation of diamond. The seed diamond provides a nucleus for such diamond precipitation, which results in growth of the diamond. There is no appreciable graphite precipitation because the concentration of carbon in the molten metal is not sufficient to permit graphite nucleation to occur; thus, the precipitating carbon "sees" only one solid carbon structure on which it may deposit, namely, the seed diamond.

To achieve positive diamond growth, the amount of carbon supersaturation with respect to graphite precipitation which is required must exceed a definite critical positive value. To achieve this minimum critical supersaturation of carbon with respect to precipitation of graphite at $T_1$, the abovementioned critical temperature differential $\Delta T_c$, is required.

The molten carrier medium is a metal or alloy which has a melting point less than about 1773° K., and a boiling point greater than about 1473° K. The molten medium should further have a small but non-zero carbon solubility limit at the operating temperatures, $T_1$ and $T_2$, which are between about 1273° K. and 3273° K. The maximum operating temperature, $T_2$, within such temperature range must not exceed a temperature at which the carbon solubility limit in the molten medium is greater than about 5% molar concentration. The low carbon solubility limit in the molten medium is necessary so that graphite precipitation will be minimized or virtually eliminated. The terms "molten medium" and "low carbon solubility" as used herein and in the appended claims are defined to have the above-indicated characteristics.

Satisfactory metals meeting the required criteria of melting and boiling points, and carbon solubility ranges, for use as the molten medium are, for example, copper, lead, aluminum, bismuth, gold, silver, antimony, tin, gallium, indium, and germanium. Such metals may be used either separately or together, for instance copper-gold, silver-gold, and lead-tin alloys.

The derivation of the equations giving the critical supersaturation of carbon with respect to graphite precipitation required in the molten medium at $T_1$ in order that diamond growth can be realized, and the method for obtaining from this critical supersaturation the critical temperature differential, $\Delta T_c$, are as follows:

The free energy of the solution (molten medium with carbon in solution) is given by the following expression:

$$G = X_C G_C + (1-X_C) G_M + NkT[X_C \ln X_C + (1-X_C) \ln (1-X_C)] \quad (1)$$

Here, $G_C$ = (molar free energy of carbon in solution) − (molar free energy of solid carbon),
$G_M$ = molar free energy of molten medium,
$X_C$ = molar concentration of carbon in solution,
$N$ = Avogadro's number,
$k$ = Boltzmann's constant per atom,
$T$ = absolute temperature.

The solubility limit is determined (to a good approximation) by setting $$\frac{\partial G}{\partial x_c} = 0$$

Performing this operation, the following equation is obtained:

$$G_C - G_M = NkT \ln \frac{1-X_{CL}}{X_{CL}} \quad (2)$$

Here, $X_{CL}$ denotes the solubility limit of carbon in the molten medium. Since $G_C$ is different if the solid carbon is in the form of diamond, D, than if it is graphite, G, then the solubility limit of diamond, $X_{DL}$, is different from the solubility limit of graphite, $X_{GL}$. Writing Equation 2 for these two specific cases (substituting first D, then G, for C) and subtracting one from the other, the following general expression is obtained:

$$\Delta G = G_G - G_D = NkT \ln \left[\frac{X_{DL}(1-X_{GL})}{X_{GL}(1-X_{DL})}\right] \quad (3)$$

From the preceding definitions of $G_G$ and $G_D$, it is seen that $\Delta G$ = (molar free energy of diamond)
 − (molar free energy of graphite)

In Equation 3, the quantity $$\frac{1-X_{GL}}{1-X_{DL}}$$

can be approximated with good accuracy by unity, since a requirement of our method is that $X_{GL}$ and $X_{DL}$ are small compared to unity. When this approximation is made, Equation 3 is solved, yielding:

$$X_{DL} = X_{GL} \exp (\Delta G/NkT) \quad (4)$$

The quantity, $\Delta G$, in Equation 4, varies with temperature but is the same for the various molten media. An expression giving its value as a function of temperature is recorded in Journal of Research of the National Bureau of Standards, vol. 21, p. 491 (1938). Using such an expression, the value of the factor $\exp (\Delta G/NkT)$ at each of a number of temperatures is readily obtained.

In our method, the diamond seed is maintained in the temperature range of about 1273° K. to 2073° K. in order for diamond growth to occur since below about 1273° K. the growth rate is negligible, and above about 2073° K. the diamond seed spontaneously reverts to the graphite form. Throughout this temperature range, the factor exp $(\Delta G/NkT)$, in Equation 4 is substantially equal to two. Therefore, Equation 4 can be rewritten as:

$$X_{DL} = 2X_{GL} \qquad (5)$$

for any of the previously mentioned molten media which are maintained at any temperature in the range 1273° K.–2073° K.

The physical significance of the foregoing derivation leading to Equation 5 is that the molten medium becomes saturated with carbon with respect to diamond precipitation when the carbon content is twice the quantity required to saturate the medium with respect to graphite precipitation. When this concentration is exceeded in the vicinity of the seed diamond, the molten medium is then supersaturated with carbon with respect to diamond precipitation, and positive diamond growth rates are realized. To achieve this degree of supersaturation, the molten medium is first saturated with carbon with respect to graphite precipitation at a temperature in excess of
$$T_1 + \Delta T_c$$
The carbon concentration achieved by this process is substantially retained upon cooling the medium to $T_1$, and is sufficient to provide, at this temperature, the required supersaturation with respect to diamond precipitation. In view of Equation 5, the critical temperature differential, $\Delta T_c$, which must be achieved is equal to $T_{2c} - T_1$, where $T_{2c}$ is defined as that particular value of $T_2$ at which $X_{GL}$ has twice the value of $X_{GL}$ at the previously chosen $T_1$. Values of $X_{GL}$ at temperatures in the present range of interest are recorded, for example, in Constitution of Binary Alloys, 2nd edition, M. Hansen, editor, McGraw-Hill Book Co., Inc., New York, 1958.

From the above criterion, $$X_{GL}(T_{2c}) = 2X_{GL}(T_1) \qquad (6)$$

and from the recorded values of $X_{GL}$, the value of $\Delta T_c$ is readily obtained. For lead, as an example, with $$T_1 = 1473° \text{ K.}$$

and $T_{2c} = 1723°$ K., the above criterion is satisfied and therefore $\Delta T_c = 250°$ K. in this case. If, again for lead, $T_1 = 1723°$ K. and $T_{2c} = 1873°$ K., the criterion is also fulfilled and in this case $\Delta T_c = 150°$ K. These examples are tabulated along with examples for some other metals in the following table:

| Metal | $T_1$ (° K.) | $T_{2c}$ (° K.) | $\Delta T_c$ (° K.) |
|---|---|---|---|
| Ag | 1,933 | 2,000 | 67 |
| Bi | 1,658 | 1,763 | 105 |
| Cu | 1,473 | 1,633 | 160 |
|  | 1,773 | 1,873 | 100 |
| Pb | 1,473 | 1,723 | 250 |
|  | 1,723 | 1,873 | 150 |
| Sb | 1,330 | 1,540 | 210 |
|  | 1,400 | 1,600 | 200 |

The growth rate of diamond depends upon the amount by which the critical temperature differential, $\Delta T_c$, is exceeded and also on the absolute temperature of the diamond seed. While diamond growth is realized for any positive amount of supersaturation with respect to diamond precipitation in the proximity of the seed diamond, faster growth rates are achieved with further increase in supersaturation. Faster growth rates are also achieved by raising the temperature of the seed diamond. Since the seed diamond is maintained at any temperature in the range of about 1273° K.–2073° K., optimum growth rates are achieved by varying, within this temperature range, either the amount by which $\Delta T$ exceeds $\Delta T_c$, or the temperature, $T_1$, of the seed diamond, or by varying both.

The rate at which the diamond grows under any prescribed set of operating conditions (temperatures and medium) can be determined from the rate at which diamond dissolves in the medium when the carbon content in said medium is substantially zero. Then, since the growth rate is substantially a linear function of carbon content, $X_C$, and its values are known at two values of carbon content, zero and $X_{DL}$, the straight line showing the value of the growth rate as a function of $X_C$ can be drawn. This is shown in FIG. 4 of the drawings.

As an example of a reaction apparatus for the continuous process which achieves the conditions for diamond growth described above, we refer to FIG. 1. This system comprises a gas-tight enclosure 1 containing a graphite block 2 to hold the molten medium 3. The source of the carbon in the molten medium is the graphite container, since molten metals dissolve carbon when in the form of graphite. The molten medium becomes saturated with carbon with respect to graphite precipitation in pool 3. Since the solubility limits for carbon in the medium under consideration are very low, the amount of graphite which is dissolved is very small, and therefore will not affect the physical integrity of the system. An inert gas atmosphere, such as helium or argon, is maintained in enclosure 1, the gas being introduced through a valved line 4. The molten medium is introduced in block 2 by removing an end nut 5. The thermal convection loop 6 is composed of two vertical arms 7 and 8, enlarged portion 9, and cross arm 10. The arms 7 and 8 are set in pool 3 and are supported in the block 2 by other graphite blocks, which are screwed into block 2. The loop 6 is composed of a high-melting-point metal such as molybdenum, tantalum, or tungsten, molybdenum being preferred. The metal selected must be resistant to corrosion by the molten medium. Enlarged portion 9 is hollowed out of a block 13 of molybdenum. The purpose of enlarged portion 9 is to provide a stagnant reservoir to prevent rapid flow of the molten medium (which might interfere with single crystal diamond growth), and the purpose of block 13 is to radiate heat to provide a cooler leg for operation of the loop by thermal convection. Heat also escapes up a tube 16 which screws into block 13 and passes outside of container 1. Enclosing loop 6, down to the level of blocks 11 and 12, is a sleeve 14 composed of, for example, one of the above metals or stainless steel and packed with thermal insulating material 15 such as lampblack. Fluid flow is accomplished by initially drawing the molten medium 3 into loop 6 by a vacuum pump which reduces the pressure sufficiently to fill the loop, and the pressure is there maintained by pressure regulator and ballast means. A seed diamond 17 is positioned on a stand 18 held by a wire 19 in the enlarged portion 9. The wire 19 passes out of portion 9 through a plug 20 at the entrance of tube 16. Vertical movement of wire 19 changes the position of stand 18 in orifice 21; thus, stand 18 serves as a flow regulator. The stand 18 and wire 19 are of one of the above metals, tantalum being preferred for the stand because of its high density, and molybdenum being preferred for the wire. Additional insulating material 22, such as lampblack, fills enclosure 1 up to sleeve 4. Heater rods 23 pass through container block 2.

Figure 2:
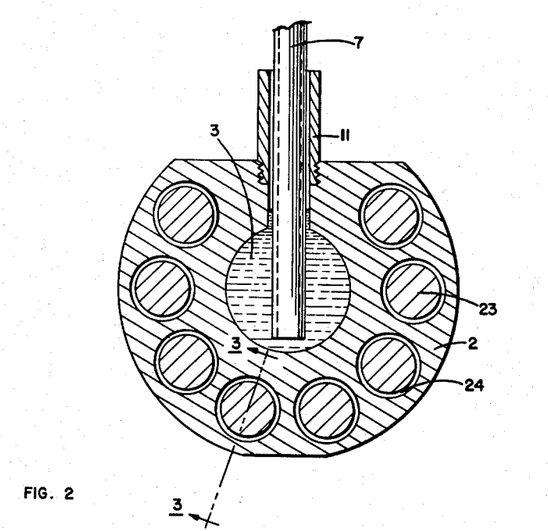
FIG. 2 is a section through FIG. 1 along the lines 2—2.
Figure 3:
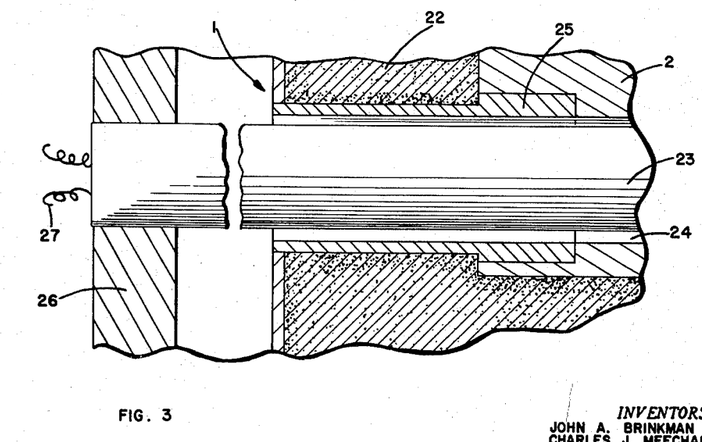
FIG. 3 is an enlarged, partial section through lines 3—3 of FIG. 2.

In FIG. 2, a section through 2—2 of FIG. 1, is seen a plurality of holes 24 drilled through block 2, through which pass heater rods 23. As shown in FIG. 3, an enlarged section through 3—3 of FIG. 2, graphite sleeves 25 are positioned in holes 24 to keep insulation 22 off of heater rods 23. The heater rods do not touch graphite sleeves 25, to prevent short circuiting, and are spaced therefrom by insulating brick supports 26 on the outside of container 1. Electrical connections 27 are made to rods 23 outside of enclosure 1.

Figure 1:
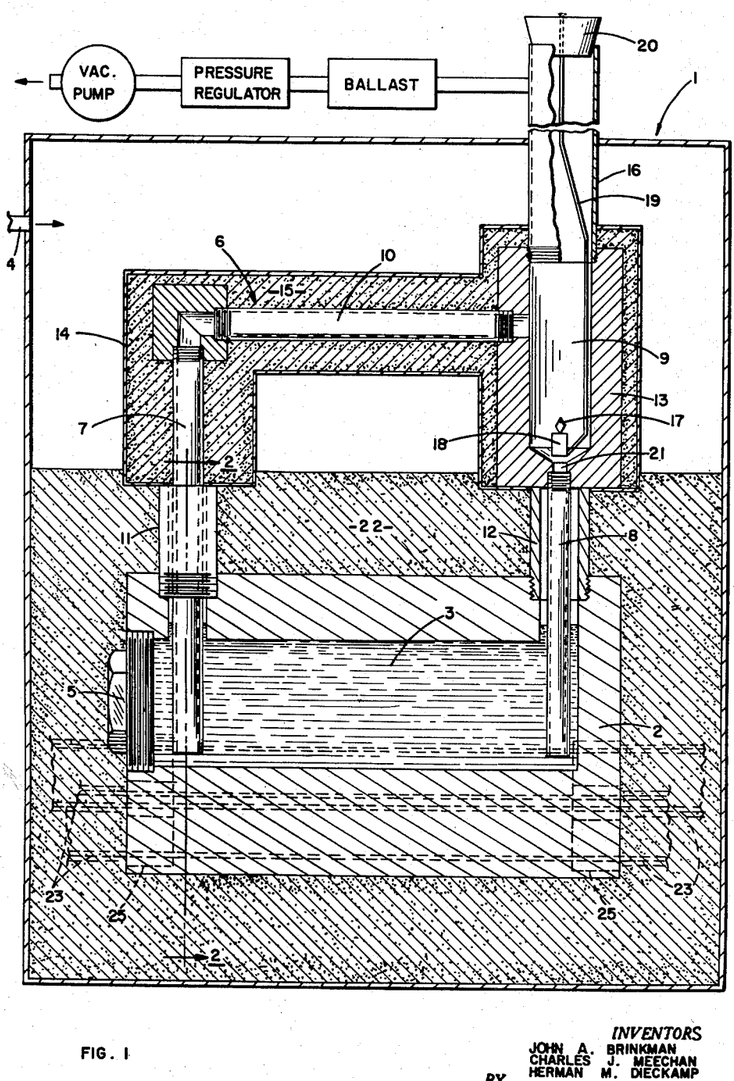
FIG. 1 is a longitudinal section of an apparatus suitable for the performance of our invention.
Figures 4, 5:
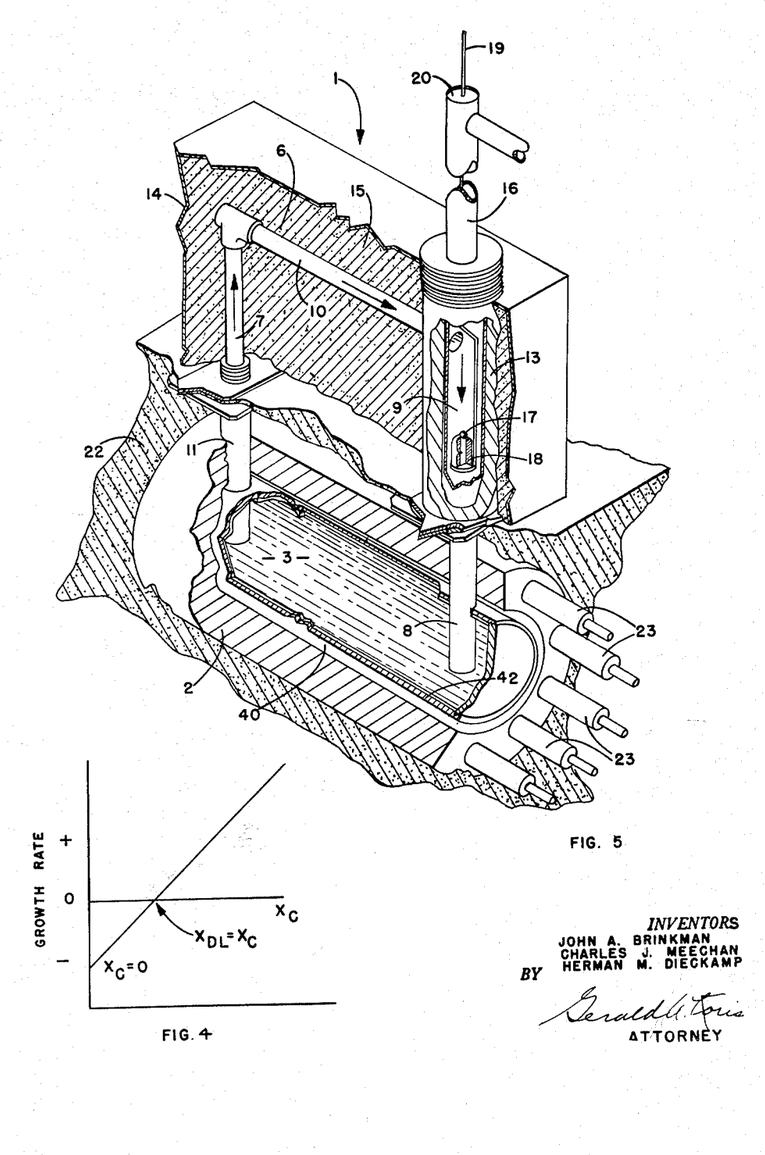
FIG. 4 is a graph showing diamond growth rate under certain operating conditions.
FIG. 5 is a perspective view of a modified version of the apparatus of FIGS. 1–3.

FIG. 5 shows essentially the same apparatus as that of FIGS. 1–3. The same reference numerals are used to identify common parts. The only difference of substance is that a molybdenum container 40 is positioned inside block 2. The purpose of this container 40 is to prevent possible diffusion of the molten medium into the block. A thin graphite liner 42 is in turn placed inside the container as the carbon source.

Figure 6:
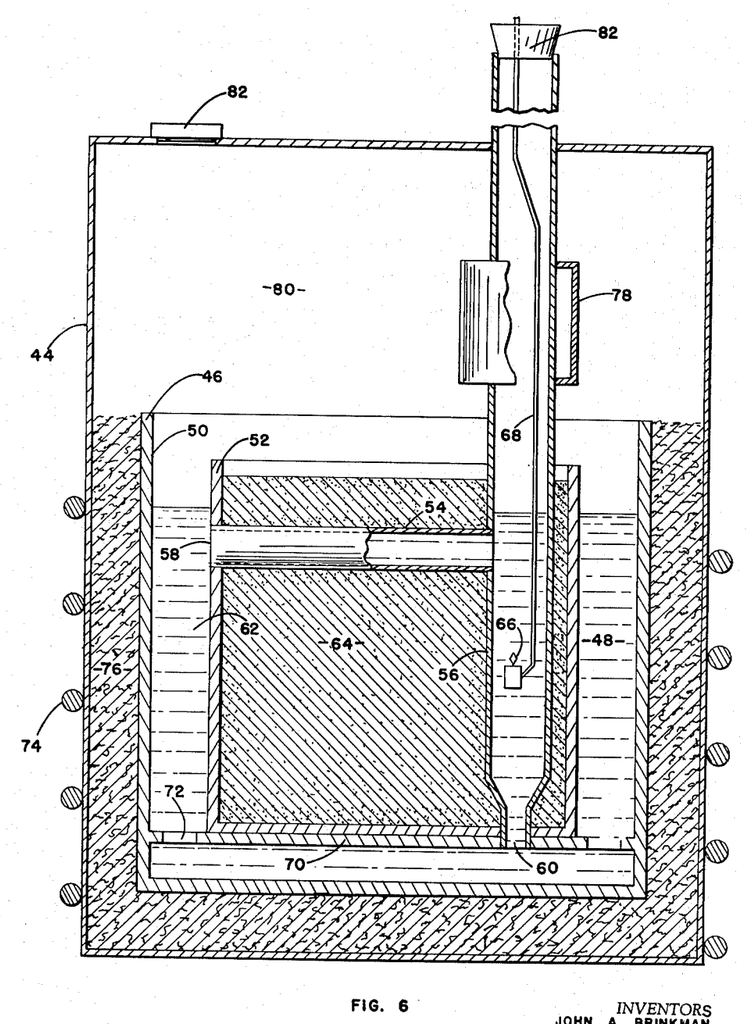
FIG. 6 is a sectionalized view of another apparatus suitable for the performance of our invention.

FIG. 6 shows another reaction apparatus suitable for the continuous process. This system comprises a gas-tight quartz enclosure 44 containing a graphite reservoir 46 which holds the molten medium 48. The source of carbon in the molten medium is the interior lining 50 of the graphite reservoir. Immersed in the molten medium is a molybdenum pot 52 which contains the molybdenum loop consisting of a horizontal arm 54 and a vertical arm which communicate with molten medium 48 at ports 58 and 60, respectively. Inside the molybdenum pot 52 and surrounding the loop arms is lampblack installation 64. A second vertical arm 62 communicating with horizontal arm 54 is defined by containers 46 and 52. The diamond 66 is attached to a molybdenum or tantalum holder 68 and immersed in molten medium 48 in vertical arm 56. The molybdenum pot 52 is positioned on a graphite stand 70 which is perforated with holes 72. This allows the molten medium to flow entirely around the molybdenum pot. The graphite reservoir is heated by means of the induction coil 74, placed outside of gas-tight container 44. Thermal insulation 76 is placed between the gas-tight container and graphite reservoir 46. A gas-cooled manifold 78 (gas cooling lines not shown) is attached to the top of the vertical arm 56 of the loop which allows for cooling this arm of the loop to the desired temperature. The enclosure is filled with inert gas 80 such as argon or helium. Temperatures in hot and cold areas 62 and 56 may be measure by pyrometers through ports 82. Flow of the molten medium is accomplished by heating the graphite reservoir holding the molten medium by means of the induction coil, while simultaneously cooling the vertical arm of the molybdenum loop. The molten medium in the cooler vertical arm will flow downward by means of thermal convection, into the bottom of the reservoir, up arm 62, through the horizontal arm of the molybdenum loop, and back into the vertical arm of the molybdenum loop.

Considering now operation of the above apparatus for the continuous process, using lead as an example of the molten medium, the lead becomes saturated with carbon with respect to graphite precipitation at a temperature of approximately 1873° K. The solubility limit of carbon in lead at 1873° K. is about 2.1 atomic percent. At 1473 K., the solubility limit decreases to about 0.5 atomic percent. Thus, as the liquid lead flows into the region of the seed diamond, it becomes highly supersaturated with carbon with respect to the precipitation of diamond. The insertion of a seed diamond, as shown in the figure, provides a nucleus for such precipitation, which results in the growth of the seed diamond. No appreciable amount of graphite nuclei will be present in the lead flowing into the right arm and the formation of such nuclei in the lead stream occurs at a negligibly small rate because of the low concentration of carbon (approximately 2 atomic percent) and the fact that a large number of carbon atoms must simultaneously diffuse together to form a graphite nucleus.

The flow rate of the molten medium in the apparatus is not critical and may satisfactorily vary because the seed diamond is positioned in a relatively stagnant flow region to permit diamond crystal growth to occur. The actual magnitude of flow rate is determined by the driving force (temperature differential, $\Delta T$, across the loop), the geometry of the loop itself, and the physical characteristics (e.g., viscosity) of the particular medium used. The operating temperature, which varies with the particular molten medium, will generally exceed 1273° K. in the cold arm where the seed diamond is placed but will be less than about 3273° K. in the hot arm of the loop. When lead is the molten medium, the cold arm is preferably operated at approximately 1473° K. and the hot arm at approximately 1873° K.

It is apparent that since our method for artificial synthesis of diamonds can be performed with the continuous process in the loops described in the drawings, it may also be performed with a batch-type process where desired. In the latter process, carbon may be dissolved in the molten medium at an elevated temperature by lining the reaction vessel with graphite and providing the reaction vessel with a heating means. The operation is then carried out at essentially atmospheric pressure as described previously in the definition of a batch-type process. It should be noted that growth will continue for as long as the critical condition is exceeded, this being determined by the degree of supersaturation and the temperature of the seed diamond, as explained previously. Thus, there is no arbitrary time duration of each immersion cycle. After growth ceases, the diamond may be removed, the temperature again raised to dissolve additional carbon, and the cycle repeated as many times as desired.

VAPOR TRANSPORT PROCESS

In the vapor transport embodiment of our invention, the carbon atom flux is supplied by evaporating carbon atoms from the surface of a carbon source consisting of a hot carbonaceous material such as graphite. The carbon flux originates at the hot graphite surface and is transported in vapor form to the diamond surface through vacuum or an inert gaseous medium such as argon or helium. The term "inert environment" is intended to embrace either a vacuum or an inert gas atmosphere. In order to prevent graphite nucleation at the diamond surface, the carbon atom flux is maintained at a sufficiently low level by regulating the temperature of the graphite source, which in turn regulates the rate of evaporation of carbon atoms. The graphite source is maintained at a temperature in excess of a minimum value at which the carbon atom flux supplied to the diamond surface equals the rate of evaporation of carbon atoms from the diamond surface. The carbon atoms reaching the diamond surface again "see" only the diamond structure on which to nucleate and therefore cause the seed diamond to grow. It is seen, therefore, that this embodiment of our method is equivalent in concept and principle to the previously described operations performed in molten media. The specific critical requirements and the method for attaining the necessary conditions for diamond growth using the vapor transport adaptation of our method will now be considered.

The equilibrium vapor pressure of carbon over a solid carbon surface is given by an equation of the following form:

$$p_C = A \exp[-F_C/RT] \qquad (7)$$

Here, $A$ is a constant depending on the units of pressure measurement and on the mass of the molecules which comprise the vapor. The quantity $F_C$ is defined, in analogy with the definition given earlier for $G_C$, as $F_C = $ (molar free energy of carbon vapor)
— (molar free energy of solid carbon)

Substituting first D, for diamond, and then G, for graphite, into Equation 7 for C, and dividing the first of the resulting equations by the second, we obtain $$p_D/p_G = \exp[(F_G - F_D)/RT] \qquad (8)$$

The quantity $(F_G - F_D)$ is equal to $\Delta G$, as previously defined. Therefore, we can write $$p_D = p_G \exp(\Delta G/RT) \qquad (9)$$

in analogy with Equation 4, and since $\exp(\Delta G/RT)$ is substantially equal to two in the temperature range 1273° K. to 2073° K., we can write, in analogy with Equation 5, $$p_D = 2p_G \qquad (10)$$

The numerical form of Equation 7, for the case where graphite is the solid surface, is $$p_G = \exp[(-88{,}800/T) + 25.5] \quad (11)$$

Then $T_{2c}$, the critical value of $T_2$ for any previously chosen $T_1$, is defined as before in Equation 6, except that graphite vapor pressures rather than solubility limits are used:

$$p_G(T_{2c}) = 2p_G(T_1) \quad (12)$$

From Equations 11 and 12, $T_{2c}$ and therefore also the critical minimum temperature differential, $\Delta T_c = T_{2c} - T_1$, can be obtained for the case where graphite is used as a source of a carbon vapor atmosphere in which a seed diamond grows.

From Equations 11 and 12, the relationship between $T_{2c}$ and $T_1$ is found to be $$\exp[(-88{,}800/T_{2c}) + 25.5] = 2\exp[(-88{,}800/T_1) + 25.5] \quad (13)$$

or $$\frac{1}{T_1} - \frac{1}{T_{2c}} = \frac{\ln 2}{88{,}800} = 7.8 \times 10^{-6} \quad (14)$$

From Equation 14, the value of $T_{2c}$ is directly calculable for any given value of $T_1$. In our method, the temperature of the diamond seed will always be in the range of about 1273° K.–2073° K. Thus $\Delta T_c$ may be as low as about 10° K. ($T_1 = 1273°$ K) or as high as about 40° K. ($T_1 = 2073°$ K.). It is to be noted here that although the limiting value of $T_2$ in the molten medium adaptation of our method is about 3273° K., the limiting value of $T_2$ for the vapor transport adaptation is about 4273° K. As stated above, however, the temperature range of the seed diamond is the same in every case, namely, 1273° K.–2073° K.

Positive growth rates of the diamond seed can only occur when the temperature of the graphite source exceeds the value of $T_{2c}$ for any previously chosen $T_1$. The complete analogy of this embodiment of our invention to that which makes use of a liquid medium as a carbon atom carrier is obvious. The significant difference is that the carrier medium is now removed. The vapor pressures of the solid forms of carbon, rather than their solubility limits in the molten medium, are now being dealt with. Since the free energy difference between diamond and graphite enters the equations in exactly the same manner in determining the ratio of vapor pressures of diamond and of graphite as it does in determining their respective solubility limits, the same factor, two, is obtained for this ratio. In this case, therefore, it is possible and convenient to simply consider the vacuum as the "carrier medium" and the solubility limit of carbon in it to be just the equilibrium vapor pressure of carbon over a solid surface of the appropriate solid form of carbon.

In similar manner, the growth rates of diamond under specified conditions for this adaptation of our method are calculable from a knowledge of the "dissolving rate into vacuum," that is, the rate of vaporization of diamond in a system in which the carbon vapor is continually removed.

The rate of loss of carbon from a graphite surface at a temperature, T, is given in "International Critical Tables of Numerical Data," Physics, Chemistry and Technology, vol. V, p. 53, 1st edition, McGraw-Hill Book Co., New York, 1929, as $$m_G = \exp\left(32.6 - \frac{1.08 \times 10^5}{T} - 1.25 \ln T\right) \quad (15)$$

Here $m_G$ represents the number of grams of carbon vaporized per cm.² of surface per second. The rate of loss of carbon from a diamond surface at a temperature $T_1$ into a vacuum is substantially $$m_D(T_1) = 2\exp\left(32.6 - \frac{1.08 \times 10^5}{T_1} - 1.25 \ln T_1\right) \quad (16)$$

The equilibrium vapor pressure over a diamond surface, from Equations 10 and 11 is $$p_D(T_1) = 2\exp[(-88{,}800/T_1) + 25.5] \quad (17)$$

When the pressure, P, of the carbon vapor atmosphere is equal to this value, the rate of deposition of carbon just equals the rate of vaporization, and the net rate of growth is zero. The net rate of deposition of carbon as diamond on a diamond seed surface held at a temperature, $T_1$, from a carbon atmosphere at a pressure, P, is equal to $$M_D = m_D(T_1) \frac{P - p_D(T_1)}{p_D(T_1)} \quad (18)$$

When graphite is used as the source at a temperature, $T_2$, the pressure, P, of carbon vapor in the vicinity of the seed diamond can be maintained substantially equal to $p_G(T_2)$. Therefore, one can write for Equation 18

$$M_D = m_D(T_1) \frac{p_G(T_2) - p_D(T_1)}{p_D(T_1)} \quad (19)$$

This is the equation for the straight line giving the diamond growth rate vs. the equilibrium vapor pressure of the graphite source, analogous to FIG. 4 for the molten media case. The quantities, $m_D(T_1)$, $p_G(T_2)$, and $p_D(T_1)$, used in Equation 19, are given in Equations 16, 11, and 17, respectively.

In view of the foregoing exact equivalence of vapor and molten carriers in presenting the necessary flux of carbon atoms to the surface of the seed diamond, the term "critical condition" is defined to mean either $X_C = 2X_{GL}$ at $T_1$ or $P = 2p_G$ at $T_1$. Thus, the "critical condition" is the establishment of an environment in the vicinity of the seed diamond in which either (1) the molar concentration of carbon in solution, $X_C$, at the temperature $T_1$, of the seed diamond, is substantially equal to twice the solubility limit of graphite, $X_{GL}$, in the solution at $T_1$, or (2) the pressure, P, of carbon vapor at $T_1$ is substantially twice the value of the equilibrium vapor pressure of graphite, $p_G$, at $T_1$. The critical condition must be exceeded in order to achieve positive diamond growth rates.

Figure 7:
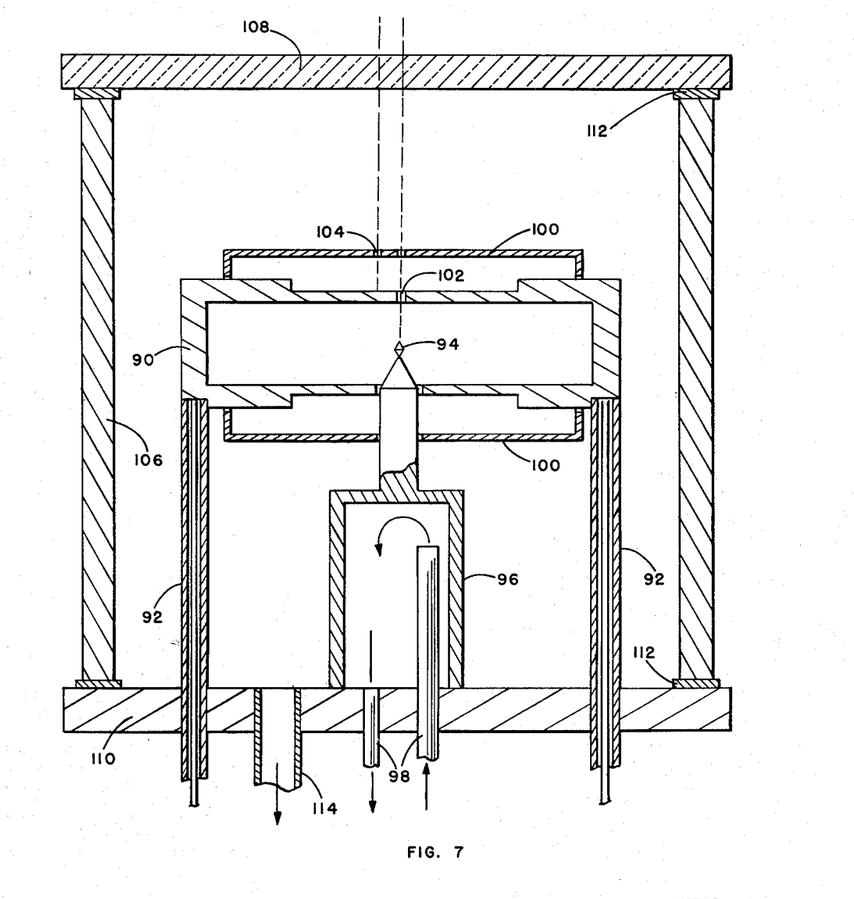
FIG. 7 is a sectionalized view of a different type of apparatus from those above which is also suitable for the performance of our invention.

An apparatus suitable for diamond growth using the vapor transport method is shown in section in FIG. 7. A graphite tube heater 90 is electrically heated by the attached water-cooled electrical leads 92. The seed diamond 94 is mounted inside graphite tube 90 on a molybdenum pedestal 96 having water cooling lines 98. The graphite tube is surrounded by a radiation shield 100. Pyrometer sight line ports 102 and 104 are provided in tube heater 90 and shield 100 for measuring the temperature of the tube and seed diamond. The seed diamond is heated by radiation from the interior walls of graphite heater 90 and cooled by water-cooled molybdenum pedestal 96. The entire assembly is in a quartz enclosure 106 having a glass top 108 and positioned on a brass mounting plate 110. Gaskets 112 between the enclosure members give leak tightness, and a vacuum is drawn on the system through line 114. Simultaneous adjustment of the cooling water flow rate and the temperature of the graphite tube reactor allows the attainment of the desired seed diamond temperature. The graphite tube serves both as a heat source for the seed diamond and also as the source of the carbon atom flux.

The following examples illustrate our invention in greater detail.

*Example 1*

It is apparent from the preceding discussion that when the carbon concentration, $X_C$, in the molten medium in the vicinity of the diamond seed is twice the value of $X_{DL}$, a positive growth rate of the diamond seed is realized which is equal in magnitude to the dissolving rate of diamond in said molten medium when $X_C = 0$. Thus, the measurement of the dissolving rate of diamond in a molten medium where $X_C = 0$, is substantially a measurement of the growth rate of diamond in said molten medium when $X_C = 2X_{DL}$. The following experiment is performed to measure the dissolving rate of diamond in lead when $X_C$ is substantially equal to zero, and also to demonstrate that the dissolving rate of diamond in lead which was saturated with carbon with respect to diamond precipitation is substantially zero. A diamond originally weighing 0.0505 gram is X-rayed and placed in a container of pure lead ($X_C=0$) at about 1473° K. The weight of the diamond after two hours in the pure lead is reduced to 0.0484 gram and after three hours the weight is further reduced to 0.0418 gram. The weight is not altered, however, after an additional two hours at 1473° K. in lead which had previously been saturated with carbon using a graphite source at a temperature of about 1723° K. After an additional two hours, however, at 1473° K. in pure lead, the weight is further reduced to 0.0399 gram. X-ray analysis of the diamond indicates that no detectable amount of diamond is transformed to the graphite structure. Thus, while the dissolving rate of diamond in pure lead is quite appreciable at 1473° K., this rate can be reduced essentially to zero by saturating the lead with carbon by dissolving graphite at a temperature of about 1723° K. The dissolving rate of diamond in pure lead at 1473° K. is approximately 2.5 millimeters per day (linear dimensions). Thus the growth rate of diamond in lead at about 1473° K. when the carbon content is equal to $2X_{DL}$ is also about 2.5 millimeters per day.

*Example 2*

The following example shows diamond growth by our method employing a batch-type process.

A reaction vessel made of molybdenum is lined with graphite and equipped with heating means consisting of an induction coil. The raction vessel is filled with lead and the temperature of the vessel and contents maintained within the range of 1843° K. to 1873° K. for a period of 15 minutes to insure saturation of the lead with carbon with respect to graphite precipitation from the graphite lining acting as the carbon source. The temperature of the reaction vessel and contents is then lowered to substantially 1523° K. and four diamonds contained in a perforated molybdenum cage, weighing 46.13 milligrams, 50.77 milligrams, 50.91 milligrams, and 48.08 milligrams, respectively, lowered into the molten lead which is kept at 1523° K. supersaturated with carbon with respect to diamond precipitation. The diamonds are kept immersed in the lead-carbon solution for a period of 30 minutes. The diamonds are then withdrawn, and the temperature of the reaction vessel and contents again raised to and maintained at substantially 1873° K. for a period of 15 minutes and then lowered to substantially 1523° K. and the diamonds re-immersed in the lead-carbon solution. The cycle of saturating the molten lead with carbon from the graphite lining in the reaction vessel at the higher temperature of 1843° K. to 1873° K. and then cooling to substantially 1523° K. and inserting the diamonds for a period of substantially 30 minutes is repeated five times until a total immersion time for the diamonds of substantially 150 minutes is obtained. The diamonds are next removed and boiled in nitric acid (3 parts of concentrated nitric diluted with 1 part of water by volume), so as to remove any lead adhering to the surface of the diamonds. The diamonds are again weighed and found to be 46.23 milligrams, 51.08 milligrams, 51.12 milligrams and 48.45 milligrams, respectively. This represents weight increases of 0.1 milligram, 0.31 milligram, 0.20 milligram and 0.37 milligram, respectively, for the four diamonds used in the experiment. It is noted that the average weight increase for the diamonds is approximately 0.5% (0.2 milligram). Next the diamonds are subjected to boiling aqua regia, washed with water, dried, and then subjected to a temperature of substantially 1573° K. in vacuum for a period of 30 minutes. The diamonds are again weighed, and no change in weight detected.

The absence of change in weight upon washing in nitric acid and aqua regia indicates that the increase in weight is due to diamond growth and not to contamination of the surface by the molten lead. The lack of change in weight upon subjecting the treated diamond to a temperature of 1573° K. for 30 minutes supports this conclusion, since during this treatment any lead on the diamond surface is removed by vaporization.

The electrical resistance of the deposited layer on the diamond is measured by placing the contacts of an ohm-meter across two faces, and a resistance of substantially 10,000 ohms observed. It is known that bort, a crystallized variety of diamond, is an electrical conductor as stated in the text, Daimond, A Descriptive Treatise, by J. R. Sutton, 1928 edition, published by D. Van Nostrand, Inc., New York, New York. This establishes that the diamond produced in this experiment is of the bort type.

Finally, X-ray patterns of the diamond containing the deposit are compared with an X-ray pattern taken from a standard untreated diamond. No difference in the patterns is discernible, and no lines indicating the presence of any graphite structure are observable.

*Example 3*

The following example shows diamond growth by our method using the continuous process with lead as the molten medium. The apparatus of FIG. 6 is employed with the loop constructed of molybdenum. A continuous flow path for the molten lead is established by thermal convection down the vertical arm, through the bottom of the reservoir, up the side of the molybdenum pot, through the horizontal molybdenum arm and back to the vertical arm. The vertical arm is cooled by a gas-cooled manifold and the temperature of the lead in this arm is maintained at about 1520° K. The molten lead in the reservoir is maintained at about 1870° K. The temperatures of the hotter and colder regions of the molten lead are measured by means of optical pyrometry. The weight of a diamond is measured and is found to be 50.00 milligrams. This diamond is inserted in a molybdenum holder and this assembly is immersed in the molten lead in the vertical arm which is maintained at about 1520° K. The diamond is removed after two hours, is etched in boiling nitric acid (3 parts concentrated $HNO_3$ to 1 part $H_2O$ by volume) which removes the lead. The diamond is heated in vacuum for 30 minutes to a temperature of about 1570° K. which further cleanses its surface. The diamond is then weighed again, the weight now being 50.25 milligrams, a weight increase amounting to 0.25 milligram. X-ray examination of the diamond is now performed and it is found that only the diamond structure is detectable. A growth rate of the diamond surface of about 2.5 millimeters per day is achieved under these conditions.

*Example 4*

The following example shows diamond growth by our method using the continuous process of FIG. 6 with silver as the molten medium and tantalum as the loop structural material. Continuous flow of the molten silver is then established by thermal convection as in Example 3. The vertical arm is cooled by an attached gas-cooled manifold and the temperature of the silver in this arm is maintained at about 1930° K. The molten silver in the reservoir is maintained at about 2080° K. The temperatures are measured by means of optical pyrometry. The weight of a diamond is measured and is found to be 40.00 milligrams. This diamond is inserted in a tantalum holder and immersed in the molten silver in the vertical loop arm which is maintained at about 1930° K. The diamond is removed after three hours, is etched in nitric acid (3 parts concentrated $HNO_3$ and 1 part $H_2O$ by volume) which removes the silver. The diamond is heated in vacuum for two hours at a temperature of about 1570° K. which further cleanses the diamond surface. The diamond is then weighed again, the weight now being 40.20 milligrams, a weight increase amounting to 0.20 milligram. X-ray examination of the diamond is now performed and it is found that only the diamond structure is detectable. A growth rate of the diamond surface of about 1.7 millimeters per day of insertion in the loop is achieved under these conditions.

*Example 5*

The following example shows diamond growth by our method using the continuous process of FIG. 6 with antimony as the molten medium and molybdenum as the loop structural material. Continuous flow of the molten antimony is established by thermal convection as in Example 3. The vertical arm is cooled by an attached gas-cooled manifold and the temperature of the antimony in this arm is maintained at about 1530° K., and the molten antimony in the reservoir is maintained at about 1800° K. The temperatures are measured by means of optical pyrometry. A diamond seed weighing 40.00 milligrams is inserted in a tantalum holder and immersed in the molten antimony in the vertical loop arm, which is maintained at about 1530° K. The diamond is removed after three hours, is etched in sulphuric acid (4 parts concentrated $H_2SO_4$ and 1 part $H_2O$ by volume) which removes the antimony. The diamond is heated in vacuum for one hour at a temperature of about 1570° K. which further cleanses the diamond surface. The diamond is weighed again, the weight now being 40.30 milligrams, a weight increase of 0.30 milligram. X-ray examination of the diamond is now performed and it is found that only the diamond structure is detectable. A growth rate of the diamond surface of about 2.2 millimeters per day is achieved under these conditions. Comparable growth rates are achieved using the other molten media disclosed above.

*Example 6*

The following example shows diamond growth by our method using the vapor transport process of FIG. 7 with graphite as the carbon source material. The interior walls of the center portion of the graphite tube are maintained at about 3000° K. The seed diamond is heated by radiation from the graphite walls and is simultaneously cooled by conduction from the molybdenum stand on which it is supported. The equilibrium temperature of the diamond is maintained at about 1600° K. All temperature measurements are made by means of optical pyrometry. A diamond seed weighing 40.00 milligrams is heated in this manner to 1600° K. for 12 hours. The diamond is removed and weighed again, the weight now being 40.40 milligrams, an increase of 0.4 milligram. An X-ray examination of the diamond reveals that only the diamond structure is detectable. The rate of growth of the diamond surface under these conditions is about 1.0 millimeter per day.

It should be appreciated that the above examples are illustrative rather than restrictive of our invention, which should be understood to be limited only as is indicated by the appended claims.

We claim:
1. A method for the artificial production of diamonds which comprises contacting a seed diamond being maintained in an inert environment reaction system at a temperature of about 1273–2073° K. with a carbon atom flux obtained by vaporizing carbon atoms from an elemental carbon source within said system such that the critical condition, $P=2p_G$ at $T_1$, is exceeded, wherein P is the carbon vapor pressure in the vicinity of the seed diamond, $p_G$ is the equilibrium vapor pressure of graphite at $T_1$, and $T_1$ is the temperature at which the seed diamond is maintained.

2. A method for the artificial production of diamonds which comprises positioning a seed diamond in an inert environment, maintaining the temperature of said diamond in said environment at about 1273–2073° K., vaporizing carbon from an elemental carbon source within said environment being maintained at a temperature greater than the temperature of said seed diamond by at least 10–40° K. to produce a flux of carbon atoms, and contacting said flux with said said seed diamond, thereby producing growth of said seed diamond.

3. The method of claim 1 wherein the maximum temperature of said carbon source is about 4273° K.

4. A method for the artificial production of diamonds which comprises providing a seed diamond in an apparatus having an inert gas atmosphere, maintaining said diamond at a temperature of about 1600° K., maintaining an elemental carbon source within said apparatus at a temperature of about 3000° K., thereby providing a flux of carbon atoms by vaporizing carbon from said source, and contacting said flux with said seed diamond to produce growth of said seed diamond.

5. The method of claim 2 wherein said inert environment is a vacuum.

6. A method for the artificial production of diamonds which comprises positioning a seed diamond in a chamber containing an elemental carbon source, drawing a vacuum in said chamber, maintaining the temperature of said seed diamond in said chamber at a temperature of about 1600° K., maintaining the temperature of said carbon source at 3000° K., thereby providing a flux of carbon atoms by vaporizing carbon from said carbon source, and contacting the resulting flux with said seed diamond to produce growth of said seed diamond.

References Cited by the Examiner

UNITED STATES PATENTS

| | | | |
|---|---|---|---|
| 3,030,187 | 4/62 | Eversole | 23—209.1 |
| 3,030,188 | 4/62 | Eversole | 23—209.1 |

MAURICE A. BRINDISI, *Primary Examiner.*